United States Patent
Cath et al.

(10) Patent No.: US 10,216,926 B2
(45) Date of Patent: Feb. 26, 2019

(54) ISOLATION OF UNTRUSTED CODE IN OPERATING SYSTEM WITHOUT ISOLATION CAPABILITY

(71) Applicant: AppDynamics LLC, San Francisco, CA (US)

(72) Inventors: Adam Cath, San Francisco, CA (US); Manoj Acharya, San Francisco, CA (US); Olivier Crameri, Larkspur, CA (US); Renault John Lecoultre, Larkspur, CA (US); Karthik Krishnamurthy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 15/011,064

(22) Filed: Jan. 29, 2016

(65) Prior Publication Data

US 2017/0220796 A1 Aug. 3, 2017

(51) Int. Cl.
 *G06F 21/53* (2013.01)
 *G06F 21/57* (2013.01)
 *G06F 9/455* (2018.01)
 *G06F 21/56* (2013.01)

(52) U.S. Cl.
 CPC .......... *G06F 21/53* (2013.01); *G06F 9/45508* (2013.01); *G06F 21/566* (2013.01); *G06F 21/577* (2013.01); *G06F 2221/033* (2013.01)

(58) Field of Classification Search
 None
 See application file for complete search history.

(56) References Cited

U.S. PATENT DOCUMENTS

| | | | | |
|---|---|---|---|---|
| 2002/0049843 A1* | 4/2002 | Barone, Jr. | ........ | H04N 7/17336 709/225 |
| 2002/0053072 A1* | 5/2002 | Steinbusch | ............. | G06F 9/381 717/148 |
| 2002/0174421 A1* | 11/2002 | Zhao | ................... | G06F 11/3419 717/174 |
| 2006/0271930 A1* | 11/2006 | Letizi | ........................ | G06F 9/52 718/1 |
| 2009/0265756 A1* | 10/2009 | Zhang | ..................... | G06F 21/53 726/1 |
| 2011/0276962 A1* | 11/2011 | Chambers | ............. | G06F 9/3885 718/1 |

(Continued)

*Primary Examiner* — William J. Goodchild
(74) *Attorney, Agent, or Firm* — Parker Ibrahim & Berg LLP; James M. Behmke; Stephen D. LeBarron (57) ABSTRACT

Code intended to operate in an operating system without an isolation mechanism is executed in isolation. The present system enables synthetic transactions to be executed in isolation without affecting other client data and files. Isolation may be outsourced to a separate set of servers that have an operating system which does support isolation. A handshake or other protocol is utilized to maintain secure data and communication. Untrusted script code provided by a customer is isolated in one or more remote servers. To execute the script on a client machine, a key is provided to access this script. A machine at which the script is to be run is provided with the key and the address of the script code on the remote server. A secure connection is established between the client machine and the script code server and script is executed on the client machine.

33 Claims, 6 Drawing Sheets

(56) References Cited

U.S. PATENT DOCUMENTS

| | | | | |
|---|---|---|---|---|
| 2012/0084563 A1* | 4/2012 | Singhal | ................... | G06F 21/32 |
| | | | | 713/168 |
| 2014/0053245 A1* | 2/2014 | Tosa | ........................ | H04L 63/08 |
| | | | | 726/4 |
| 2015/0324789 A1* | 11/2015 | Dvorak | .............. | G06Q 20/3823 |
| | | | | 705/67 |
| 2015/0356555 A1* | 12/2015 | Pennanen | .............. | G06Q 20/06 |
| | | | | 705/71 |

* cited by examiner

ISOLATION OF UNTRUSTED CODE IN OPERATING SYSTEM WITHOUT ISOLATION CAPABILITY

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. In addition to monitoring transactions initiated by live users, many system users want to know how their system performs when executing synthetic transactions. When performing synthetic transactions, a client will typically provide an application monitoring system administrator with script code to be executed on the client's system. The script code is an unknown quantity to the application performance management system, and is typically treated as untrusted code.

It is important that application program management systems protect their customer's privacy and provide data security. In order to protect their privacy, they must protect information that their customers place on their servers. In some instances, in some operating systems, is not possible to isolate files of a first customer from files of a second customer. What is needed is an improved manner for maintaining privacy and security of application program management customer data and systems.

SUMMARY

The present technology, roughly described, allows for isolation to be achieved in an operating system which does not provide any technology for providing isolated technology inherently. As a result of the ability to isolate untrusted code in operating systems without any isolation mechanisms, the present system can enable synthetic transactions to be executed in isolation without affecting other client data and files. Isolation may be outsourced to a separate set of servers that have an operating system which does support isolation. A handshake or other protocol is utilized to maintain secure data and communication. In some instances, untrusted script code provided by a customer is isolated in one or more remote servers. To execute the script on a client machine, a key is provided to access this script. Machine at which the script is to be run is provided with the key and the address of the script code on the remote server. A secure connection is established between the client machine and the script code server, script is executed on the client machine, thereby allowing a client machine with a first operating system that does not allow for isolation to execute script code in a secure manner without affecting other client information.

Some implementations may include a method for isolating untrusted code. A virtual machine can be configured on a server with a first operating system to initiate a synthetic transaction. Untrusted code can be executed on the virtual machine. The first operating system can provide an isolation mechanism in which the untrusted code is executed. A secure connection can be established between the virtual machine having the first operating system and a remote client machine having a second operating system. The second operating system may not have any isolation system, and the first operating system can be different than the second operating system. Instructions can be generated by the untrusted code executing on the virtual machine to the remote client having the second operating system.

An embodiment may include a system for isolating untrusted code. The system may include a processor, memory, and one or more modules stored in memory and executable by the processor. When executed, the modules configure a virtual machine on a server with a first operating system to initiate a synthetic transaction, execute untrusted code on the virtual machine, the first operating system providing an isolation mechanism in which the untrusted code is executed, establish a secure connection between the virtual machine having the first operating system and a remote client machine having a second operating system, the second operating system not having any isolation system, the first operating system different than the second operating system and apply instructions generated by the untrusted code executing on the virtual machine to the remote client having the second operating system.

DETAILED DESCRIPTION

The present technology, roughly described, allows for isolation to be achieved in an operating system which does not provide any technology for providing isolated technology inherently. As a result of the ability to isolate untrusted code in operating systems without any isolation mechanisms, the present system can enable synthetic transactions to be executed in isolation without affecting other client data and files. Isolation may be outsourced to a separate set of servers that have an operating system which does support isolation. A handshake or other protocol is utilized to maintain secure data and communication. In some instances, untrusted script code provided by a customer is isolated in one or more remote servers. To execute the script on a client machine, a key is provided to access this script. Machine at which the script is to be run is provided with the key and the address of the script code on the remote server. A secure connection is established between the client machine and the script code server, script is executed on the client machine, thereby allowing a client machine with a first operating system that does not allow for isolation to execute script code in a secure manner without affecting other client information.

Figure 1:
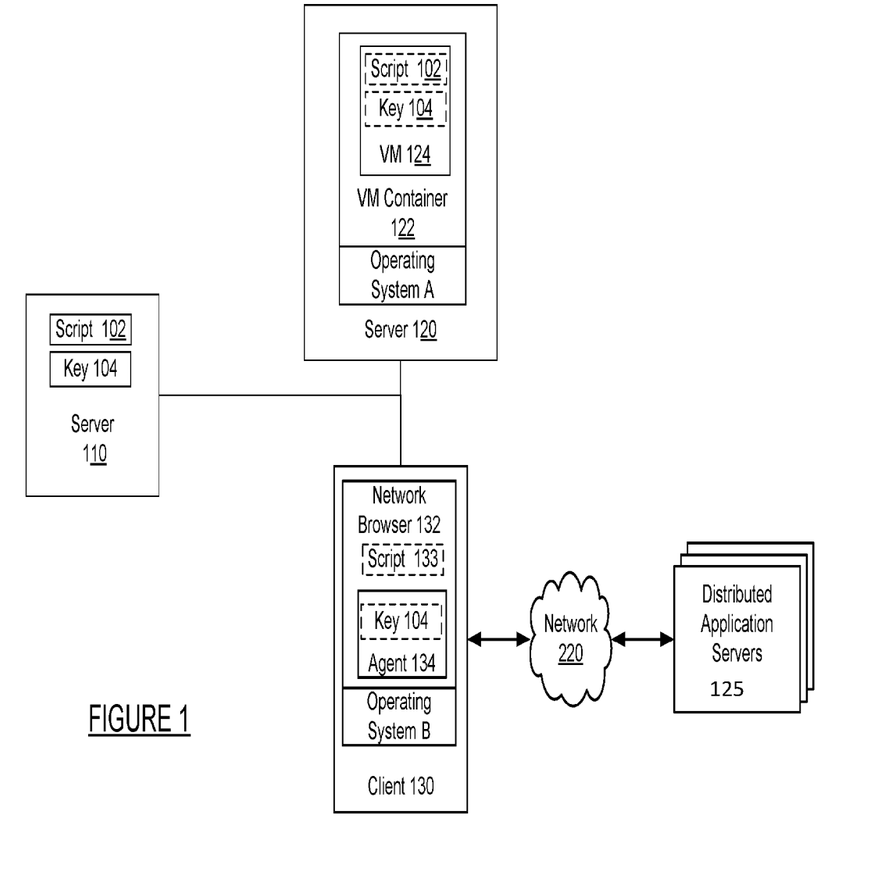
FIG. 1 is a block diagram of an exemplary system for performing isolated synthetic transaction monitoring.

FIG. 1 is a block diagram of a system for performing isolated synthetic transaction monitoring. The system of FIG. 1 includes server 110, server 120, client 130, network 120, and distributed application servers 125. Server 110 may include script 102 provided by a customer of an application program monitoring service. The script provided by the customer may execute to perform or initiate synthetic transactions on one or more systems of the client. The script received from the client is not trusted, and should be executed in an isolated environment.

To isolate an untrusted script, the script should be maintained and executed in an isolated environment. Some operating systems do not include an isolation mechanism from which to execute an untrusted script. As such, if the operation system of a machine to execute a script from does not include an isolation mechanism, an untrusted script may not be executed on that operating system.

Client 130 includes network browser 132 and operating system B. Certain operating systems, such as Microsoft Windows, do not have a mechanism for isolating program execution. As such, the script 102 cannot be executed on an operating system such as Windows without risking harm to other client data or information. This becomes an issue when a client wants script 102 to be executed on a network browser 132 which executes on an operating system without isolation.

The present technology solves this issue by executing an untrusted script in a remote isolated environment that is created only for the purposes of executing the script in an isolated environment. The isolated environment initiates a virtual machine that will apply the script to a network browser. The virtual machine is isolated from other client code that may be executing on a client machine. Further, a key is used to establish a secure connection between the isolated virtual machine and a client device executing a client browser in an operating system with no isolation capability.

Key 104 is provided along with script 102 by server 110 to server 120. The key 104 may be used to establish a secure connection with a virtual machine 124. Virtual machine container 122 may operate on operating system A which allows for isolation of virtual machines. The script and key are received by virtual machine container 122 and used to create virtual machine 124. Virtual machine 124 may be configured to require key 104 to establish a connection with virtual machine 124. After being configured and initialized, virtual machine container 122 may provide server 120 a confirmation that virtual machine 124 is initialized along with an address for virtual machine 124.

After configuring the virtual machine 124, server 120 may provide a copy of key 104 and the address of the virtual machine to network browser 132 installed on client 130. Network browser 132 may receive the key 104 and use the key to initiate a connection with virtual machine 124 at the provided address. Once a secure connection is established between network browser 132 and virtual machine 124, script 102 may be executed to have instructions performed on a browser page provided by network browser 132. The script code instructions may include clicks, interface selections, data entry, and other actions applied as input into an interface provided by network browser 132.

When input is received by network browser 132, the browser may communicate with a set of distributed application servers 225 over network 120 to process the received input and perform other actions. The distributed application servers 125 may include servers 23, 240, 250 and 260 as well as data stores 280 and 285 of the system of FIG. 2.

Figure 2:
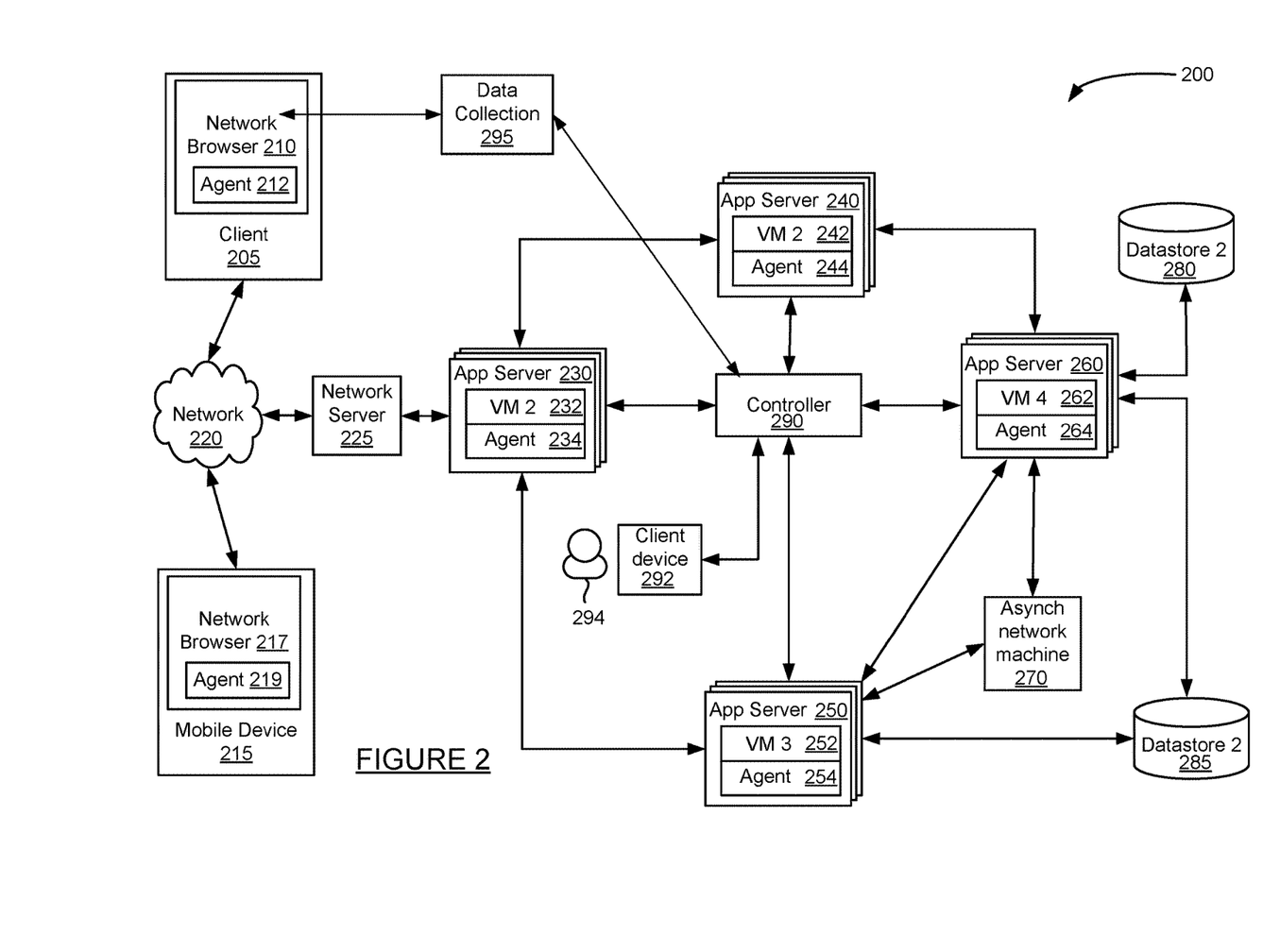
FIG. 2 is a block diagram of an exemplary system for monitoring an isolated synthetic transaction.

FIG. 2 is a block diagram of a system for monitoring a distributed business transaction. System 200 of FIG. 2 includes client device 205 and 292, mobile device 215, network 220, network server 225, application servers 230, 240, 250 and 260, asynchronous network machine 270, data stores 280 and 285, controller 290, and data collection server 295.

Client device 205 may include network browser 210 and be implemented as a computing device, such as for example a laptop, desktop, workstation, or some other computing device. Network browser 210 may be a client application for viewing content provided by an application server, such as application server 230 via network server 225 over network 220.

Network browser 210 may include agent 212. Agent 212 may be installed on network browser 210 and/or client 205 as a network browser add-on, downloading the application to the server, or in some other manner. Agent 212 may be executed to monitor network browser 210, the operation system of client 205, and any other application, API, or other component of client 205. Agent 212 may determine network browser navigation timing metrics, access browser cookies, monitor code, and transmit data to data collection 260, controller 290, or another device. Agent 212 may perform other operations related to monitoring a request or a network at client 205 as discussed herein.

Mobile device 215 is connected to network 220 and may be implemented as a portable device suitable for sending and receiving content over a network, such as for example a mobile phone, smart phone, tablet computer, or other portable device. Both client device 205 and mobile device 215 may include hardware and/or software configured to access a web service provided by network server 225.

Mobile device 215 may include network browser 217 and an agent 219. Mobile device may also include client applications and other code that may be monitored by agent 219. Agent 219 may reside in and/or communicate with network browser 217, as well as communicate with other applications, an operating system, APIs and other hardware and software on mobile device 215. Agent 219 may have similar functionality as that described herein for agent 212 on client 205, and may repot data to data collection server 260 and/or controller 290.

Network 220 may facilitate communication of data between different servers, devices and machines of system 200 (some connections shown with lines to network 220, some not shown). The network may be implemented as a private network, public network, intranet, the Internet, a cellular network, Wi-Fi network, VoIP network, or a combination of one or more of these networks. The network 220 may include one or more machines such as load balance machines and other machines.

Network server 225 is connected to network 220 and may receive and process requests received over network 220. Network server 225 may be implemented as one or more servers implementing a network service, and may be implemented on the same machine as application server 230 or one or more separate machines. When network 220 is the Internet, network server 225 may be implemented as a web server.

Application server 230 communicates with network server 225, application servers 240 and 250, and controller 290. Application server 230 may also communicate with other machines and devices (not illustrated in FIG. 2). Application server 230 may host an application or portions of a distributed application. The host application 232 may be in one of many platforms, such as including a Java, PHP, .Net, and Node.JS, be implemented as a Java virtual machine, or include some other host type. Application server 230 may also include one or more agents 234 (i.e. "modules"), including an application agent, machine agent, and network agent, and other software modules. Application server 230 may be implemented as one server or multiple servers as illustrated in FIG. 2.

Application 232 and other software on application server 230 may be instrumented using byte code insertion, or byte code instrumentation (BCI), to modify the object code of the application or other software. The instrumented object code may include code used to detect calls received by application 232, calls sent by application 232, and communicate with agent 234 during execution of the application. BCI may also be used to monitor one or more sockets of the application and/or application server in order to monitor the socket and capture packets coming over the socket.

In some embodiments, server 230 may include applications and/or code other than a virtual machine. For example, server 230 may include Java code, .Net code, PHP code, Ruby code, C code or other code to implement applications and process requests received from a remote source.

Agents 234, 244, 254 and 264 on application server 230 may be installed, downloaded, embedded, or otherwise provided on application server 230. For example, agents 234 may be provided in server 230 by instrumentation of object code, downloading the agents to the server, or in some other manner. Agents 234 may be executed to monitor application server 230, monitor code running in a or a virtual machine 232 (or other program language, such as a PHP, .Net, or C program), machine resources, network layer data, and communicate with byte instrumented code on application server 230 and one or more applications on application server 230.

Each of agents 234, 244, 254 and 264 may include one or more agents, such as an application agents, machine agents, and network agents. An application agent may be a type of agent that is suitable to run on a particular host. Examples of application agents include a JAVA agent, .Net agent, PHP agent, and other agents. The machine agent may collect data from a particular machine on which it is installed. A network agent may capture network information, such as data collected from a socket.

Agent 234 may detect operations such as receiving calls and sending requests by application server 230, resource usage, and incoming packets. Agent 234 may receive data, process the data, for example by aggregating data into metrics, and transmit the data and/or metrics to controller 290. Agent 234 may perform other operations related to monitoring applications and application server 230 as discussed herein. For example, agent 234 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

An application agent may be an agent suitable to instrument or modify, collect data from, and reside on a host. The host may be a Java, PHP, .Net, Node.JS, or other type of platform. Application agents may collect flow data as well as data associated with the execution of a particular application. The application agent may instrument the lowest level of the application to gather the flow data. The flow data may indicate which tier is communicating which with which tier and on which port. In some instances, the flow data collected from the application agent includes a source IP, a source port, a destination IP, and a destination port. The application agent may report the application data and call chain data to a controller. The application agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from an application agent that is associated with applications to be monitored. For flows in the flow group data that match flow data provided by the application agent, the network agent rolls up the flow data to determine metrics such as TCP throughput, TCP loss, latency and bandwidth. The network agent may then reports the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the application agent, network agent, and machine agent may report data to the controller. Controller 290 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 234 may create a request identifier for a request received by server 230 (for example, a request received by a client 205 or 215 associated with a user or another source). The request identifier may be sent to client 205 or mobile device 215, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, now U.S. Pat. No. 9,167,028, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, now U.S. Pat. No. 9,311,598, the disclosures of which are incorporated herein by reference.

Each of application servers 240, 250 and 260 may include an application and agents. Each application may run on the corresponding application server. Each of applications 242, 252 and 262 on application servers 240-260 may operate similarly to application 232 and perform at least a portion of a distributed business transaction. Agents 244, 254 and 264 may monitor applications 242-262, collect and process data at runtime, and communicate with controller 290. The applications 232, 242, 252 and 262 may communicate with each other as part of performing a distributed transaction. In particular each application may call any application or method of another virtual machine.

Asynchronous network machine 270 may engage in asynchronous communications with one or more application servers, such as application server 250 and 260. For example, application server 250 may transmit several calls or messages to an asynchronous network machine. Rather than communicate back to application server 250, the asynchronous network machine may process the messages and eventually provide a response, such as a processed message, to application server 260. Because there is no return message from the asynchronous network machine to application server 250, the communications between them are asynchronous.

Data stores 280 and 285 may each be accessed by application servers such as application server 260. Data store 285 may also be accessed by application server 250. Each of data stores 280 and 285 may store data, process data, and return queries received from an application server. Each of data stores 280 and 285 may or may not include an agent.

Controller 290 may control and manage monitoring of business transactions distributed over application servers 230-260. In some embodiments, controller 290 may receive application data, including data associated with monitoring client requests at client 205 and mobile device 215, from application server 260. In some embodiments, controller 290 may receive application monitoring data and network data from each of agents 212, 219, 234, 244 and 254. Controller 290 may associate portions of business transaction data, communicate with agents to configure collection of data, and provide performance data and reporting through an interface. The interface may be viewed as a web-based interface viewable by client device 292, which may be a mobile device, client device, or any other platform for viewing an interface provided by controller 290. In some embodiments, a client device 292 may directly communicate with controller 290 to view an interface for monitoring data.

Client device 292 may include any computing device, including a mobile device or a client computer such as a desktop, work station or other computing device. Client computer 292 may communicate with controller 290 to create and view a custom interface. In some embodiments, controller 290 provides an interface for creating and viewing the custom interface as a content page, e.g., a web page, which may be provided to and rendered through a network browser application on client device 292.

Applications 232, 242, 252 and 262 may be any of several types of applications. Examples of applications that may implement applications 232-262 include a Java, PHP, .Net, Node.JS, and other applications.

Figure 3:
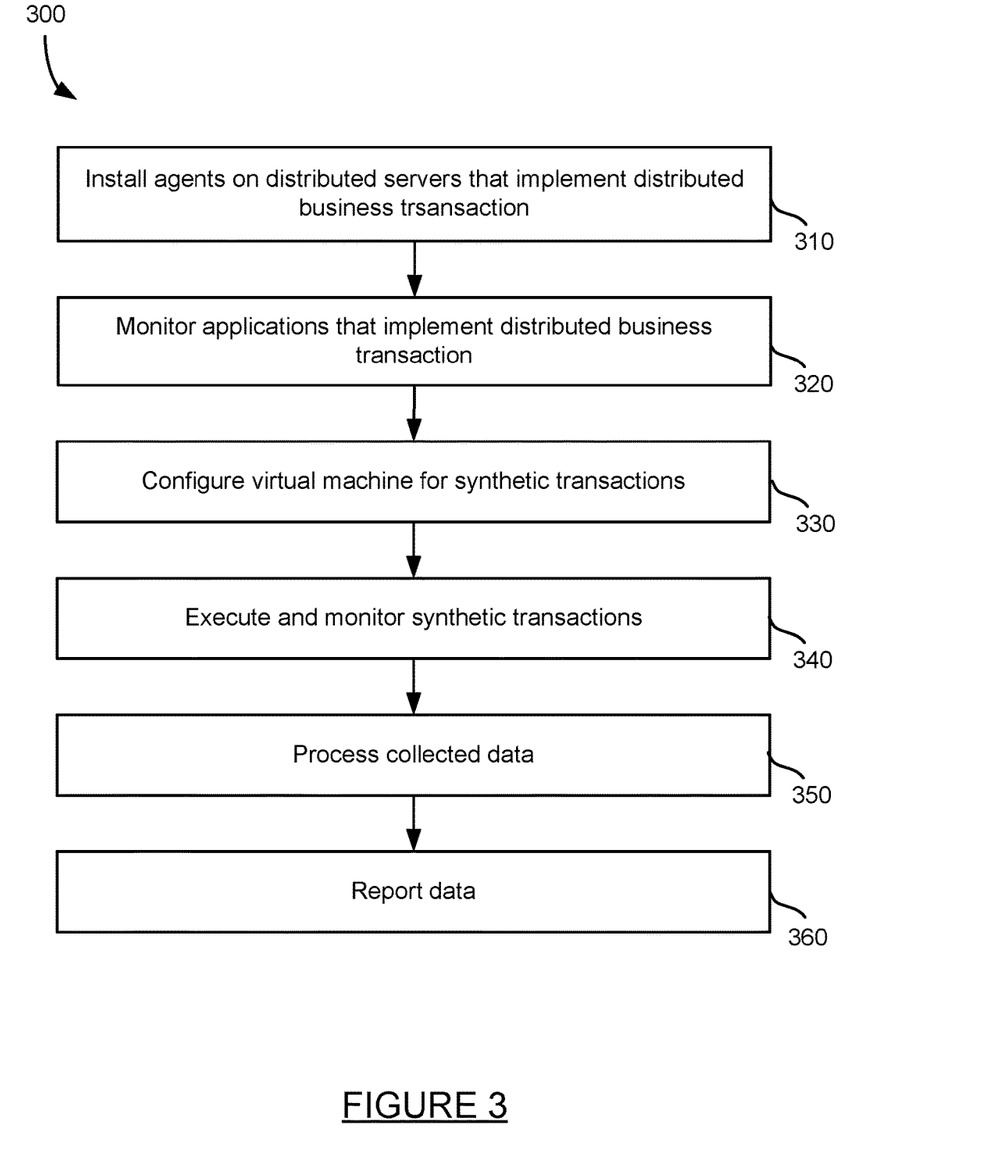
FIG. 3 is an exemplary method for performing isolated synthetic transaction monitoring.

FIG. 3 is a method for performing isolated synthetic transaction monitoring. First, agents are installed on distributed servers that implement the distributed business transaction at step 310. The agents may be installed on client 130, as well as one or more servers in the system of FIG. 2. Applications that implement a distributed business transaction may then be monitored at step 320. Monitoring may include collecting data by the one or more agents, storing the data, aggregating the data, and reporting the aggregated data to controller 290. The data may be reported periodically, in response to a request by controller 290, or upon some other event.

Virtual machines for synthetic transactions may be configured at step 330. In addition to monitoring user interaction with a particular system, synthetic distributed business transactions that are initiated by code or other automated means may also be monitored. These synthetic transactions may be configured based on script and/or other instructions which can be applied to a network browser. The virtual machine may be configured within an isolated environment and may communicate over secure transmission channels or tunnels, such as for example an SSH tunnel, with a browser application through which the script should be executed. More details for configuring an isolated virtual machine for synthetic transactions is discussed below with respect to the method of FIG. 4.

After virtual machines are configured, synthetic transactions may be executed and monitored at step 340. Executing the synthetic transactions includes executing script code to perform one or more actions in at a network browser and thereby initiate one more distributed business transactions. The one or more actions may include, for example, providing input to a user interface provided by network browser at a particular client machine. Because code that implements synthetic transactions may not be trusted, the source of the instructions may occur at a server having a first operating system in which the code may be isolated. The isolated executing code may instruct a network browser application on a second server with a second operating system. More details for executing and monitoring synthetic transactions is discussed below with respect to the method of FIG. 5.

Data collected as a result of monitoring the transactions is processed at step 350. The data may be collected by one or more agents executing on the client machines and servers that implement the transaction. Processing the data may include aggregating the data at one or more agents, reporting the aggregated data to one or more controllers, processing the data received from various agents to stitch the received data into a distributed business transaction, and determining metrics, patterns, and trends in the data. Data may be reported at step 360. The reported data may include metrics, patterns and trends, and a variety of formats such as graphs, tables, and alerts.

Figure 4:
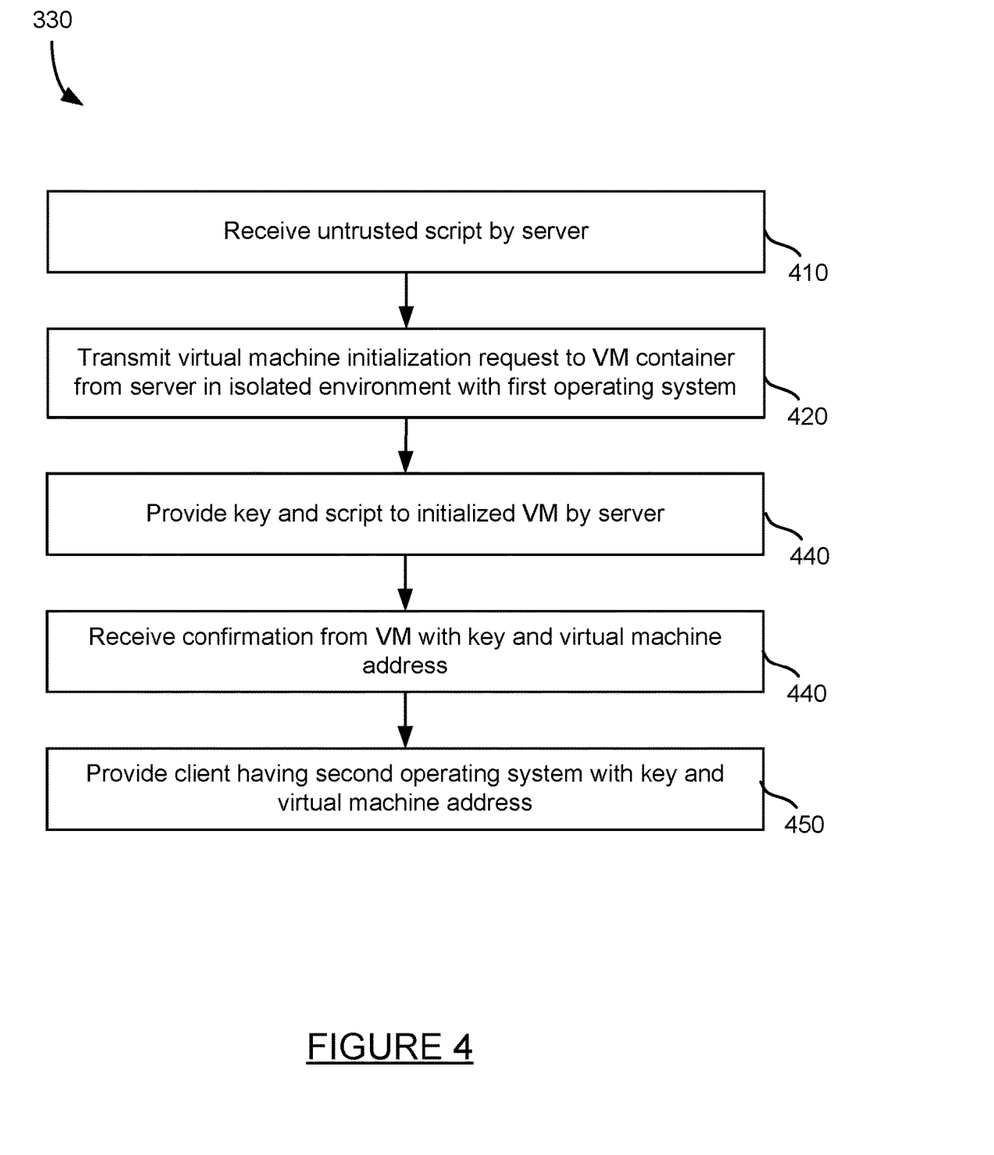
FIG. 4 is an exemplary method for configuring virtual machines for synthetic transactions.

FIG. 4 is a method for configuring virtual machines for synthetic transactions. The method of FIG. 4 provides more detail for step 330 of the method of FIG. 3. First, an untrusted script may be received by server 110 at step 410. Server 110 may receive the script from a client of the application performance management system. A virtual machine initialization request is transmitted to a virtual machine container 122 at step 420. The request may be sent from server 110 to the container that provides an isolated environment within a first operating system. As shown in FIG. 1, virtual machine container 122 is provided within operating system A of server 120. Virtual machine container 122 provides an isolated system for implementing one or more virtual machines within operating system A. Operating system A may include a Linux OS, Windows OS, iOS, or other operating system.

A key 104 and script 102 are provided to the initialized virtual machine 124 by a server at step 440. The key may be used by virtual machine 124 to establish a secure connection with an outside entity such as network browser application 132. The script may be subsequently applied to network browser 132 by virtual machine 124 or, at least in part, loaded into network browser application 132 for execution. In any case, execution of script 102 may initiate a synthetic transaction on network browser application 132.

A confirmation is received from virtual machine 124 at step 440. Confirmation may acknowledge the received key as well as provide a virtual machine address to server 110. After receiving the confirmation, server 110 may provide agent 134 with the key and the virtual machine address at step 450. The key may be used to establish a secure connection with virtual machine 124 over network. The virtual machine address may be used to identify the location of the virtual machine so the secure connection can be initiated.

Figure 5:
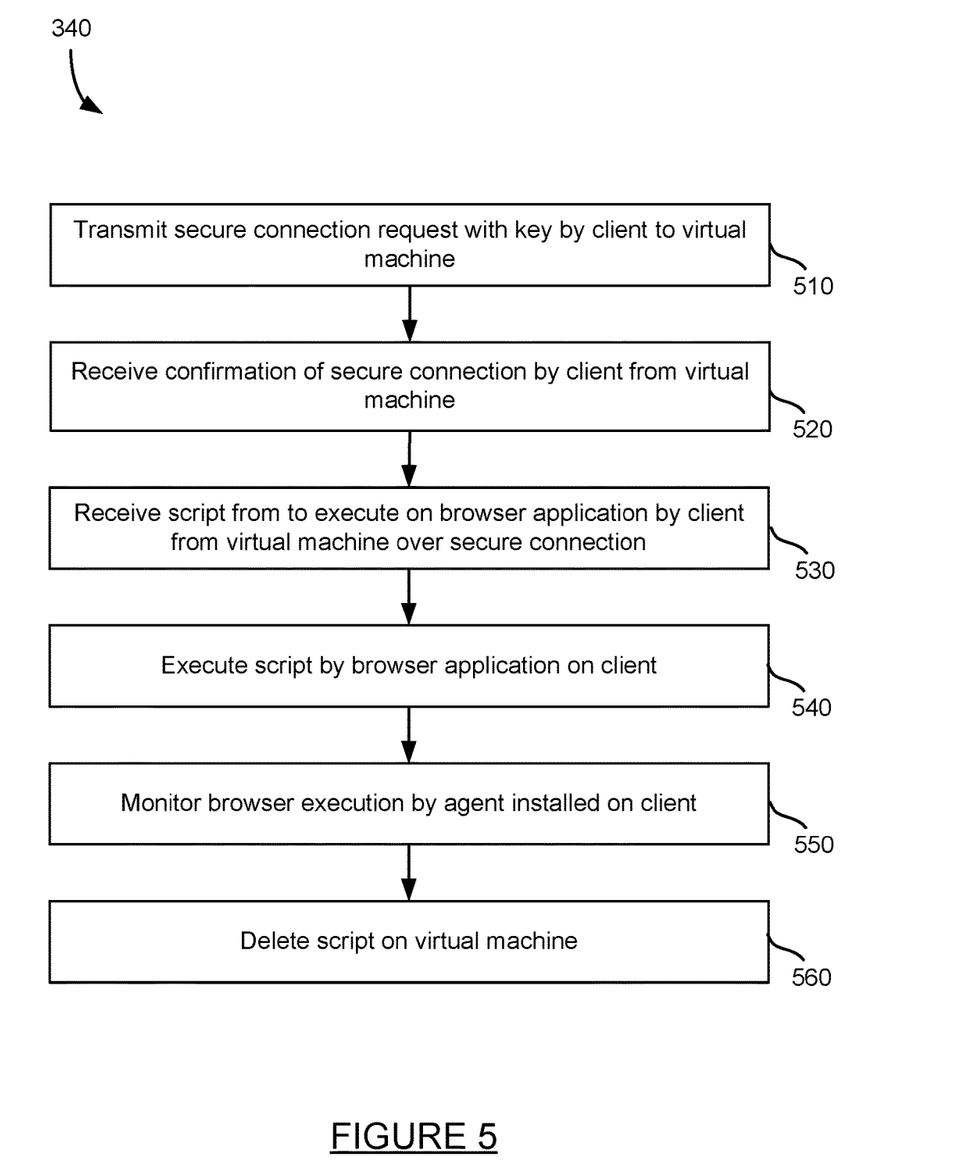
FIG. 5 is an exemplary method for executing and monitoring synthetic transactions.

FIG. 5 is a method for executing and monitoring synthetic transactions. The method of FIG. 5 provides more detail for step 340 of the method of FIG. 3. First, a secure connection request is transmitted by network browser application 132 to virtual machine 124 at step 510. The request may include key 104 provided to network browser 132 by server 110. The key is required to establish a connection with virtual machine 124 which also includes a copy of the key. A request is sent to the address provided by virtual machine 124 to server 110 and pass along to the network browser 132. After transmitting the secure connection request, a confirmation of a secure connection may be received by client 130 from virtual machine 124 at step 520. At this point, the secure connection is established between virtual machine 124 and client 130, and communications between the virtual machine and client will be encrypted.

A script for execution on a browser application is received by client 130 from the virtual machine 124 over the secure connection at step 530. The script is loaded into network browser 132 and executed by the browser at step 540. The executed script may load particular pages, provide input, select buttons, and otherwise interact with a browser page provided by network browser 132. The browser is monitored by an agent 134 installed on the client at step 550. Agent 134 may monitor performance of the browser in executing the script and communicating with distributed application servers 225 over network 120. Monitoring the browser by an agent may include identifying time and identification of input received by the browser, processing by browser code, send times of requests by the browser, and receipt and loading of responses and other messages by network browser 132.

Once the script has completed execution, the script is deleted from the virtual machine 124 at step 560. In some instances, the script may delete itself from virtual machine 124. In some instances, virtual machine 124 may delete the script once script execution has completed. Server 110 may inquire with virtual machine container 122 and/or virtual machine 124 whether script execution has completed. Upon completion, server 110 may remove script 102 from virtual machine 124. Removal of script 102 from virtual machine 124, either by the script itself or by server 110, insurers that the script will not pose any security risk to scripts or other content from other clients located within virtual machine container 122 or virtual machine 124.

Figure 6:
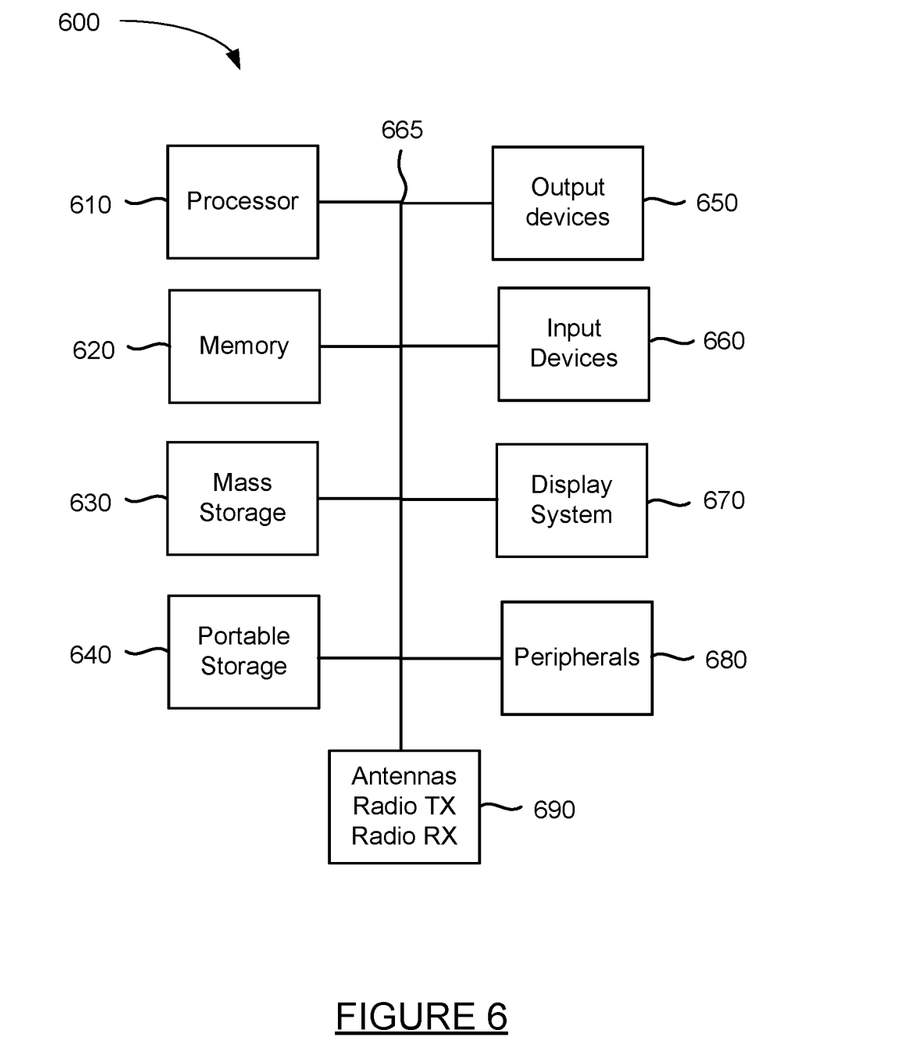
FIG. 6 is a block diagram of an exemplary computing environment for the present technology.

FIG. 6 is a block diagram of a system for implementing the present technology. System 600 of FIG. 6 may be implemented in the contexts of the likes of client computer 130, 205 and 292, servers 110, 120, 125, 225, 230, 240, 250, and 260, machine 270, data stores 280 and 285, and controller 290. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 665. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive, an optical disk drive, a flash drive, or other device, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, USB drive, memory card or stick, or other portable or removable memory, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device. Display system 670 may also receive input as a touch-screen.

Peripherals 680 may include any type of computer support device to add additional functionality to the computer system. For example, peripheral device(s) 680 may include a modem or a router, printer, and other device.

The system of 600 may also include, in some implementations, antennas, radio transmitters and radio receivers 690. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for isolating untrusted code, the method comprising:
    configuring a virtual machine on a server connected to a remote client machine, wherein the sever executes a first operating system to initiate a synthetic transaction;
    executing untrusted code on the virtual machine, the first operating system providing an isolation mechanism in which the untrusted code is executed;
    establishing a secure connection between the virtual machine having the first operating system and the remote client machine having a second operating system, the second operating system not having any isolation system, the first operating system different than the second operating system;
    executing the synthetic transaction over the secure connection with the second operating system not having any isolation system, the synthetic transaction initiating a distributed business transaction over a plurality of distributed servers, wherein isolation for the second operating system is outsourced to the server executing on the first operating system; and
    applying instructions generated by the untrusted code executing on the virtual machine to the remote client having the second operating system.

2. The method of claim 1, wherein the virtual machine is created within a secure and isolated container mechanism.

3. The method of claim 1, wherein configuring the virtual machine includes providing the virtual machine with a key, the key required to establish the secure connection with the client machine.

4. The method of claim 1, wherein configuring the virtual machine includes providing the virtual machine with script code initiates a synthetic transaction.

5. The method of claim 4, wherein the script code transmits instructions from the virtual machine to the client machine over the secure connection.

6. The method of claim 5, wherein the script code executes at least partially within a network browser application on the client device.

7. The method of claim 1, wherein the second operating system of the computing machine is a Windows operating system.

8. The method of claim 1, the method further comprising:
    determining execution of a script has completed; and
    terminating the virtual machine.

9. The method of claim 1, further comprising installing agents on a plurality of distributed application servers and the client machine that performs a synthetic distributed business transaction.

10. The method of claim 1, wherein the client machine is one of a plurality of distributed client machines that may execute a script code to have a computing machine initiate the distributed business transaction.

11. The method of claim 1, further comprising:
    monitoring the synthetic transaction by an agent on the client machine.

12. A non-transitory computer readable storage medium having embodied thereon a program, the program being executable by a processor to perform a method for monitoring a synthetic distributed business transaction, the method comprising:
    configuring a virtual machine on a server connected to a remote client machine, the server configured to execute a first operating system to initiate a synthetic transaction;
    executing untrusted code on the virtual machine, the first operating system providing an isolation mechanism in which the untrusted code is executed;
    establishing a secure connection between the virtual machine having the first operating system and a remote client machine having a second operating system, the second operating system not having any isolation system, the first operating system different than the second operating system;
    executing the synthetic transaction over the secure connection with the second operating system not having any isolation system, the synthetic transaction initiating a distributed business transaction over a plurality of distributed servers, wherein isolation for the second operating system is outsourced to the server executing on the first operating system; and
    applying instructions generated by the untrusted code executing on the virtual machine to the remote client having the second operating system.

13. The non-transitory computer readable storage medium of claim 12, wherein the virtual machine is created within a secure and isolated container mechanism.

14. The non-transitory computer readable storage medium of claim 12, wherein configuring the virtual machine includes providing the virtual machine with a key, the key required to establish the secure connection with the client machine.

15. The non-transitory computer readable storage medium of claim 12, wherein configuring the virtual machine includes providing the virtual machine with script code initiates a synthetic transaction.

16. The non-transitory computer readable storage medium of claim 15, wherein the script code transmits instructions from the virtual machine to the client machine over the secure connection.

17. The non-transitory computer readable storage medium of claim 16, wherein the script code executes at least partially within a network browser application on the client device.

18. The non-transitory computer readable storage medium of claim 12, wherein the second operating system of the computing machine is a Windows operating system.

19. The non-transitory computer readable storage medium of claim 12, the method further comprising:
    determining execution of the script has completed; and
    terminating the virtual machine.

20. The non-transitory computer readable storage medium of claim 12, the method further comprising installing agents on a plurality of distributed application servers and the client machine that performs a synthetic distributed business transaction.

21. The non-transitory computer readable storage medium of claim 12, wherein the client machine is one of a plurality of distributed client machines that may execute the script code to have a computing machine initiate the distributed business transaction.

22. The non-transitory computer readable storage medium of claim 12, the method further comprising:
    monitoring the synthetic transaction by an agent on the client machine.

23. A system for monitoring a synthetic distributed business transaction, comprising:
  a server including a memory and a processor, the server connected to a remote client machine;
  a client machine having a memory and a processor;
  one or more modules stored in memory on the server or client machine and executed by a processor on the server or client machine to configure a virtual machine on a server with a first operating system to initiate a synthetic transaction, execute untrusted code on the virtual machine, the first operating system providing an isolation mechanism in which the untrusted code is executed, establish a secure connection between the virtual machine having the first operating system and the remote client machine having a second operating system, the second operating system not having any isolation system, the first operating system different than the second operating system, execute the synthetic transaction over the secure connection with the second operating system not having any isolation system, the synthetic transaction initiating a distributed business transaction over a plurality of distributed servers, wherein isolation for the second operating system is outsourced to the server executing on the first operating system, and apply instructions generated by the untrusted code executing on the virtual machine to the remote client having the second operating system.

24. The system of claim 23, wherein the virtual machine is created within a secure and isolated container mechanism.

25. The system of claim 23, wherein configuring the virtual machine includes providing the virtual machine with a key, the key required to establish the secure connection with the client machine.

26. The system of claim 23, wherein configuring the virtual machine includes providing the virtual machine with script code initiates a synthetic transaction.

27. The system of claim 26, wherein the script code transmits instructions from the virtual machine to the client machine over the secure connection.

28. The system of claim 27, wherein the script code executes at least partially within a network browser application on the client device.

29. The system of claim 23, wherein the second operating system of the computing machine is a Windows operating system.

30. The system of claim 23, the one or more modules further executable to determine execution of the script has completed and terminate the virtual machine.

31. The system of claim 23, the one or more modules further executable to install agents on a plurality of distributed application servers and the client machine that performs a synthetic distributed business transaction.

32. The system of claim 23, wherein the client machine is one of a plurality of distributed client machines that may execute the script code to have a computing machine initiate the distributed business transaction.

33. The system of claim 23, the one or more modules further executable to monitor the synthetic transaction by an agent on the client machine.

* * * * *